US012738504B2

(12) United States Patent
Park et al.

(10) Patent No.: US 12,738,504 B2
(45) Date of Patent: Sep. 15, 2026

(54) ELECTRODE, MANUFACTURING METHOD THEREOF, AND SECONDARY BATTERY INCLUDING SAME

(71) Applicant: LG ENERGY SOLUTION, LTD., Seoul (KR)

(72) Inventors: Jun Soo Park, Daejeon (KR); Bum Young Jung, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 733 days.

(21) Appl. No.: 17/792,647

(22) PCT Filed: Feb. 24, 2021

(86) PCT No.: PCT/KR2021/002290

§ 371 (c)(1), (2) Date: Jul. 13, 2022

(87) PCT Pub. No.: WO2021/172855

PCT Pub. Date: Sep. 2, 2021

(65) Prior Publication Data

US 2023/0031167 A1 Feb. 2, 2023

(30) Foreign Application Priority Data

Feb. 27, 2020 (KR) ........................ 10-2020-0024422

(51) Int. Cl.
*H01M 4/139* (2010.01)
*H01M 4/04* (2006.01)
(Continued)

(52) U.S. Cl.
CPC ......... *H01M 4/623* (2013.01); *H01M 4/0435* (2013.01); *H01M 4/74* (2013.01);
(Continued)

(58) Field of Classification Search
None
See application file for complete search history.

(56) References Cited

U.S. PATENT DOCUMENTS 5,387,645 A 2/1995 Montag et al.
2008/0299461 A1 12/2008 Kim
(Continued)

FOREIGN PATENT DOCUMENTS

CN 106654154 A 5/2017
CN 107565986 A 1/2018
(Continued)

OTHER PUBLICATIONS

Translation of KR100739944B1 published Jul. 16, 2007. Cited in IDS of Aug. 18, 2023. (Year: 2007).*
(Continued)

*Primary Examiner* — Tracy M Dove
(74) *Attorney, Agent, or Firm* — Birch, Stewart, Kolasch & Birch, LLP

(57) ABSTRACT

An electrode including an electrode active material sheet including an electrode active material and a binder polymer; and a current collector having a mesh structure. At least a part of the mesh structure is present in the electrode active material sheet, and the binder polymer has a thermal decomposition temperature ranging from 270 °C to 315 °C.

2 Claims, 1 Drawing Sheet

(51) Int. Cl.

| | |
|---|---|
| ***H01M 4/62*** | (2006.01) |
| ***H01M 4/74*** | (2006.01) |
| *H01M 4/02* | (2006.01) |
| *H01M 4/38* | (2006.01) |
| *H01M 4/587* | (2010.01) |

(52) U.S. Cl.

CPC ...... *H01M 2004/027* (2013.01); *H01M 4/386* (2013.01); *H01M 4/587* (2013.01)

(56) References Cited

U.S. PATENT DOCUMENTS

| | | | |
|---|---|---|---|
| 2011/0123864 A1 | 5/2011 | Choi et al. | |
| 2011/0287303 A1 | 11/2011 | Roh et al. | |
| 2014/0199584 A1 | 7/2014 | Kondo et al. | |
| 2016/0336587 A1 | 11/2016 | Jung et al. | |
| 2019/0326583 A1 | 10/2019 | Zhang | |
| 2019/0341616 A1* | 11/2019 | Yoon | H01M 4/622 |
| 2020/0052279 A1 | 2/2020 | Chen | |
| 2020/0194797 A1 | 6/2020 | Kim et al. | |
| 2021/0020898 A1 | 1/2021 | Lee et al. | |

FOREIGN PATENT DOCUMENTS

| | | | | |
|---|---|---|---|---|
| CN | 110197892 A | | 9/2019 | |
| EP | 3 480 870 A1 | | 5/2019 | |
| JP | 5-151964 A | | 6/1993 | |
| JP | 2002-25547 A | | 1/2002 | |
| JP | 2010-225393 A | | 10/2010 | |
| JP | 2011-134691 A | | 7/2011 | |
| JP | 2014-78318 A | | 5/2014 | |
| JP | 2014-167859 A | | 9/2014 | |
| JP | 2014-238971 A | | 12/2014 | |
| JP | 2019-129075 A | | 8/2019 | |
| JP | 2019-527452 A | | 9/2019 | |
| KR | 100739944 B1 | * | 7/2007 | |
| KR | 10-2008-0105853 A | | 12/2008 | |
| KR | 10-1049826 B1 | | 7/2011 | |
| KR | 10-2011-0128085 A | | 11/2011 | |
| KR | 10-1147241 B1 | | 5/2012 | |
| KR | 20140008957 A | * | 1/2014 | H01M 4/485 |
| KR | 10-2014-0015841 A | | 2/2014 | |
| KR | 10-1416803 B1 | | 8/2014 | |
| KR | 10-1764470 B1 | | 8/2017 | |
| KR | 10-2018-0040334 A | | 4/2018 | |
| KR | 10-2018-0067154 A | | 6/2018 | |
| KR | 10-2019-0109284 A | | 9/2019 | |
| WO | WO 2013/145109 A1 | | 10/2013 | |

OTHER PUBLICATIONS

KR2014-0008957A (English translation) (Year: 2014).*

Extended European Search Report for European Application No. 21761656.4, dated May 31, 2023.

International Search Report for PCT/KR2021/002290 mailed on Jun. 3, 2021.

Indian Office Action (with English-language translation) for Indian Application No. 202217040447, dated Jul. 9, 2026.

* cited by examiner

[FIG. 1]
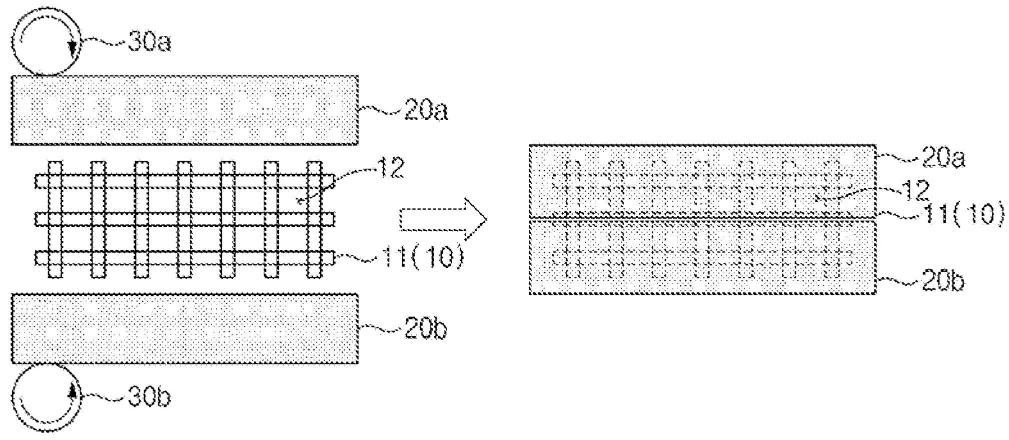
[FIG. 2]
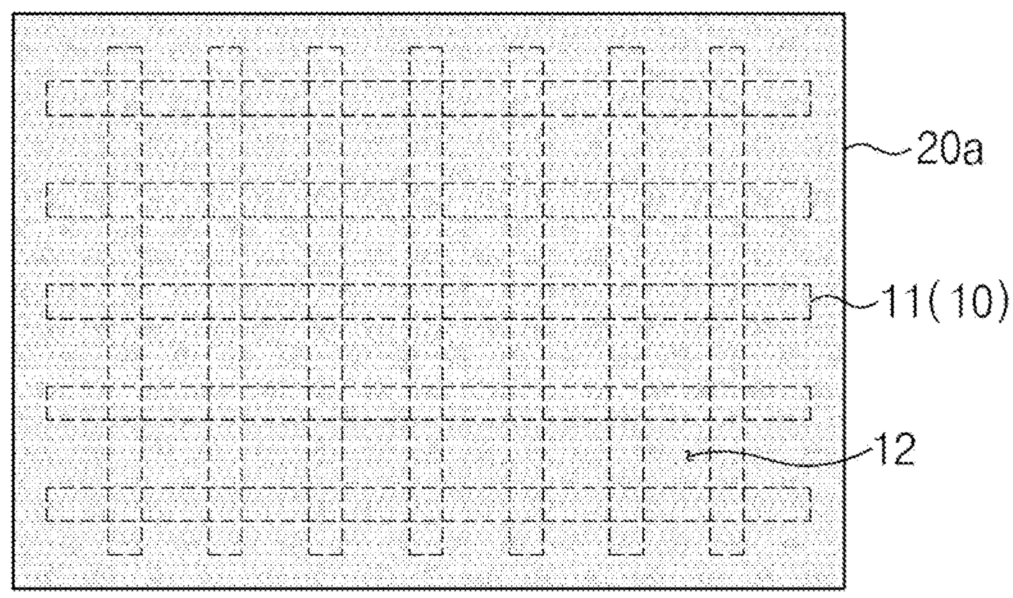

ELECTRODE, MANUFACTURING METHOD THEREOF, AND SECONDARY BATTERY INCLUDING SAME

CROSS-REFERENCE TO RELATED APPLICATION

This application claims priority to and the benefit of Korean Patent Application No. 10-2020-0024422, filed on Feb. 27, 2020, the disclosure of which is incorporated herein by reference in its entirety.

TECHNICAL FIELD

The present invention relates to an electrode, a method of manufacturing the same, and a secondary battery including the same.

BACKGROUND ART

With the rapid increase in the use of fossil fuels, the demand for the use of alternative energy or clean energy is increasing, and the fields that are most actively studied as part of the increasing demand are the fields of power generation and storage using electrochemical reactions.

Secondary batteries are representative examples of today's electrochemical devices using such electrochemical energy. The secondary batteries generate electrical power through electrochemical oxidation and reduction reactions and are widely used for various purposes. For example, the range of use of the secondary batteries is gradually expanding to devices that can be carried in a person's hand, such as mobile phones, laptop computers, digital cameras, video cameras, tablet computers, and power tools, various electrically driven power devices such as electric bicycles, electric motorcycles, electric vehicles, hybrid vehicles, electric boats, and electric airplanes, power storage devices used for storing power generated through renewable energy or generated surplus power, and uninterruptible power supply devices for stably supplying power to various information communication devices including server computers and communication base stations.

In general, the secondary batteries include a positive electrode, a negative electrode, an electrolyte, and a separator. In this case, electrodes such as the positive electrode and the negative electrode may be manufactured by applying an electrode slurry including an electrode active material onto a current collector and performing roll-pressing and drying. The secondary batteries may be inserted into an exterior packing material and used in the form of a battery pack.

Meanwhile, when a sharp object made of metal exerts a significant impact on a secondary battery, the object may penetrate an electrode. In this case, the metal object may be electrically connected with a current collector or electrically connect electrodes of different polarities and form a short circuit, and a large short circuit current may flow in the short circuit, causing a large amount of heat to be generated. Since the generated heat may cause the rapid decomposition of an electrolyte, there is a concern about generating a large amount of gas and the rapid generation of heat which may cause the secondary battery to explode.

Therefore, various attempts have been made in the secondary battery field to improve safety under nail penetration conditions, and for example, approaches such as reducing the amount of current by increasing the resistance of an electrode or forming a coating layer on an electrode have been tried. However, these approaches cause an increase in resistance or a decrease in the amount of current and thus contradict the direction of development of secondary batteries pursuing high output.

Therefore, in the field of secondary batteries requiring high output, the development of secondary batteries with enhanced safety under nail penetration conditions is required.

Korean Patent Laid-Open Publication No. 10-2014-0015841 discloses a lithium secondary battery including an electrode on which a double coating layer is formed to improve safety under nail penetration conditions. Still, there is a limitation in solving the above-described problems.

RELATED-ART DOCUMENT

Patent Document

Korean Patent Laid-Open Publication No. 10-2014-0015841

DETAILED DESCRIPTION OF THE INVENTION

Technical Problem

The present invention is directed to providing an electrode which has excellent safety under nail penetration conditions and exhibits excellent output characteristics due to reduced resistance.

In addition, the present invention is directed to providing a method of manufacturing the above-described electrode.

In addition, the present invention is directed to providing a secondary battery including the above-described electrode.

Technical Solution

One aspect of the present invention provides an electrode, which comprises: an electrode active material sheet comprising an electrode active material and a binder polymer; and a current collector having a mesh structure, wherein at least a part of the mesh structure is present in the electrode active material sheet, and the binder polymer has a thermal decomposition temperature ranging from 270° C. to 315° C.

Another aspect of the present invention provides a method of manufacturing the above-described electrode, which comprises: preparing a current collector having a mesh structure and an electrode active material sheet including the electrode active material and the binder polymer; and placing the electrode active material sheet on the current collector and applying pressure to insert at least a part of the mesh structure into the electrode active material sheet.

Still another aspect of the present invention provides a secondary battery including the above-described electrode.

Advantageous Effects

An electrode of the present invention includes an electrode active material sheet and a current collector including a mesh structure, at least part of which is inserted into the electrode active material sheet, and therefore, when a metal object such as a nail penetrates the electrode, either the metal object does not come into contact with the mesh structure, or, even when the metal object makes contact with the mesh structure, only a part of the mesh structure is cut. Therefore, the area of contact between the current collector and the metal object is reduced, and thus an electrical short circuit can be prevented, and safety under nail penetration conditions can be improved.

In addition, according to the electrode of the present invention, since a binder polymer having a specific thermal decomposition temperature range is included in the electrode active material sheet and thus the heat resistance of the electrode active material sheet is improved to a desirable level, resistance in the electrode active material sheet can be reduced at the same time as safety under nail penetration conditions is improved, and therefore, an electrode and a secondary battery with enhanced safety under nail penetration conditions and improved output characteristics can be realized.

In addition, a method of manufacturing an electrode of the present invention includes a process of placing the electrode active material sheet on the current collector including the mesh structure and applying pressure, and therefore, the electrode with enhanced safety under nail penetration conditions and improved output characteristics can be manufactured. In addition, the electrode active material sheet formed using the binder polymer having a specific thermal decomposition temperature range can exhibit excellent adhesion to the current collector.

DESCRIPTION OF DRAWINGS

FIG. 1 is a diagram for schematically illustrating a method of manufacturing an electrode of the present invention.

FIG. 2 is a schematic plan view of an electrode manufactured by a method of manufacturing an electrode of the present invention.

MODE OF THE INVENTION

Terms and words used in this specification and the claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

The terms used in the present specification have been used only for the purpose of describing exemplary embodiments and are not intended to limit the present invention. Singular expressions include plural expressions unless the context clearly indicates otherwise.

It will be understood that terms such as "comprising", "including", or "having", when used in the present specification, specify the presence of stated features, numbers, steps, components, or combinations thereof and do not preclude the possibility of the presence or addition of one or more other features, numbers, steps, components, or combinations thereof.

In the present specification, an average particle diameter ($D_{50}$) may be defined as a particle diameter corresponding to the 50% cumulative volume in a particle diameter distribution curve. The average particle diameter ($D_{50}$) may be measured using, for example, a laser diffraction method. The laser diffraction method generally allows for the measurement of a particle diameter ranging from a submicron level to several millimeters and can produce a result having high reproducibility and high resolution.

Hereinafter, the present invention will be described in detail.

<Electrode>

One aspect of the present invention provides an electrode, specifically, an electrode for a lithium secondary battery.

Specifically, the electrode of the present invention comprises: an electrode active material sheet comprising an electrode active material and a binder polymer; and a current collector having a mesh structure, wherein a part of the mesh structure is inserted into the electrode active material sheet, and the binder polymer has a thermal decomposition temperature ranging from 270° C. to 315° C.

Since the electrode of the present invention includes an electrode active material sheet and a current collector including a mesh structure, at least part of which is inserted into the electrode active material sheet, when a metal object such as a nail penetrates the electrode, either the metal object does not come into contact with the mesh structure, or, even when the metal object makes contact with the mesh structure, only a part of the mesh structure is cut. Therefore, the area in which the current collector comes into contact with the metal object is reduced, and thus an electrical short circuit can be prevented, and safety under nail penetration conditions can be improved.

In addition, according to the electrode of the present invention, since a binder polymer having a specific thermal decomposition temperature range is included in the electrode active material sheet and thus the heat resistance of the electrode active material sheet is improved to a desirable level, resistance in the electrode active material sheet can be reduced at the same time as safety under nail penetration conditions is improved, and therefore, an electrode and a secondary battery with enhanced safety under nail penetration conditions and improved output characteristics can be realized.

The electrode active material sheet includes an electrode active material and a binder polymer.

The electrode active material may be selected from among a positive electrode active material and negative electrode active material, and specifically, the electrode active material may be a negative electrode active material. As the positive electrode active material and the negative electrode active material, a positive electrode active material and a negative electrode active material commonly used in the art may be used without limitation.

The negative electrode active material may be one or more selected from among a carbon-based active material and a silicon-based active material, and specifically, the negative electrode active material may be a carbon-based active material.

The carbon-based active material may include one or more selected from the group consisting of artificial graphite, natural graphite, hard carbon, soft carbon, carbon black, graphene, and fibrous carbon, and preferably, the carbon-based active material includes one or more selected from the group consisting of artificial graphite and natural graphite.

The average particle diameter ($D_{50}$) of the carbon-based active material may be in the range of 3μ to 25μ and preferably 8μ to 15 μt in terms of ensuring the structural stability of the active material during charging and discharging and further increasing the accessibility of a binder polymer used for binding an active material and a current collector.

The silicon-based active material may include a compound represented as $SiO_x$ ($0 \leq x < 2$). Since $SiO_2$ does not react with lithium ions and thus cannot store lithium, it is preferable that x satisfies the above range.

The average particle diameter ($D_{50}$) of the silicon-based active material may be in the range of 1.it is pro and preferably 2μ to 10 μt in terms of ensuring the structural stability of the active material during charging and discharging and further increasing the accessibility of a binder polymer used for binding an active material and a current collector.

The positive electrode active material may include a compound enabling the reversible intercalation and deintercalation of lithium, specifically, a lithium composite metal oxide including lithium and one or more metals such as cobalt, manganese, nickel, or aluminum. More specifically, the lithium composite metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (here, $0<Y<1$), $LiMn_{2-z}Ni_zO_4$ (here, $0<Z<2$), etc.), a lithium-nickel-cobalt-based oxide (e.g., $LiNi_{1-Y1}CO_{Y1}O_2$ (here, $0<Y1<1$), etc.), a lithium-manganese-cobalt-based oxide (e.g., $LiCo_{1-Y2}Mn_{Y2}O_2$ (here, $0<Y2<1$), $LiMn_{2-Z1}Co_{Z1}O_4$ (here, $0<Z1<2$), etc.), a lithium-nickel-manganese-cobalt-based oxide (e.g., $Li(Ni_pCo_qMn_{r1})O_2$ (here, $0<p<1$, $0<q<1$, $0<r1<1$, and $p+q+r1=1$), $Li(Ni_{p1}Co_{q1}Mn_{r2})O_4$ (here, $0<p1<2$, $0<q1<2$, $0<r2<2$, and $p1+q1+r2=2$), etc.), or a lithium-nickel-cobalt-transition metal (M) oxide (e.g., $Li(Ni_{p2}Co_{q2}Mn_{r3}M_{S2})O_2$ (here, M is selected from the group consisting of Al, Fe, V, Cr, Ti, Ta, Mg and Mo, and p2, q2, r3 and s2 represent an atomic fraction of each independent element, and satisfy $0<p2<1$, $0<q2<1$, $0<r3<1$, $0<s2<1$, and $p2+q2+r3+s2=1$), etc.), and these compounds may be used alone or in a combination of two or more thereof. In particular, to improve the capacity characteristics and stability of a battery, the lithium composite metal oxide may be $LiCoO_2$, $LiMnO_2$, $LiNiO_2$, a lithium-nickel-manganese-cobalt-based oxide (e.g., $Li(Ni_{0.6}Mn_{0.2}Co_{0.2})O_2$, $Li(Ni_{0.5}Mn_{0.3}Co_{0.2})O_2$, $Li(Ni_{0.8}Mn_{0.1}Co_{0.1})O_2$, etc.), or a lithium-nickel-cobalt-aluminum-based oxide (e.g., $Li(Ni_{0.8}Co_{0.15}Al_{0.05})O_2$, etc.), and considering that the adjustment of the types and content ratio of constituent elements forming the lithium composite metal oxide has a remarkable improvement effect, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, or the like, and these compounds may be used alone or in a combination of two or more thereof.

The electrode active material may be included in an amount of 80% to 99% by weight and preferably 90% to 97% by weight in the electrode active material sheet.

The binder polymer may be used for the binding between the electrode active material sheet and the current collector or between electrode active materials in the electrode active material sheet.

The thermal decomposition temperature of the binder polymer is in the range of 270° C. to 315° C. When the thermal decomposition temperature of the binder polymer satisfies the above range, since the heat resistance and strength of the binder polymer can be improved to a desired level, even when the electrode is penetrated by an external object, the risk of electrode explosion can be significantly reduced, and at the same time, the resistance of the electrode active material sheet can be reduced, and thus the output characteristics of the electrode can be improved.

When the thermal decomposition temperature of the binder polymer is less than 270° C., since the heat resistance and strength of the binder polymer are not improved to an appropriate level, safety under nail penetration conditions may be degraded. When thermal decomposition temperature of the binder polymer exceeds 315° C., the heat resistance of the binder polymer is increased, but the adhesive strength of the binder polymer may be significantly reduced and thus an active material may be detached from the current collector such that stability may be reduced and the resistance of the electrode active material sheet may be increased, and thus output characteristics may be degraded.

Preferably, the thermal decomposition temperature of the binder polymer is in the range of 290° C. to 305° C., and when this range is satisfied, all of the heat resistance, strength, and adhesive strength of the binder polymer can be improved to an excellent level, and thus safety under nail penetration conditions and battery characteristics can be improved.

The binder polymer may include a first binder polymer and a second binder polymer which are different from each other. Since the first binder polymer and the second binder polymer are used together, the binder polymer having a desired thermal decomposition temperature can be realized, and thus an electrode with enhanced safety under nail penetration conditions and improved output characteristics can be manufactured.

The first binder polymer may be one or more selected from the group consisting of styrene-butadiene rubber (SBR), polyvinylidene fluoride (PVdF), a polyvinylidene fluoride-hexafluoropropylene copolymer (PVDF-co-HFP), polyacrylonitrile, polymethylmethacrylate, polyvinyl alcohol, carboxymethyl cellulose (CMC), starch, hydroxypropyl cellulose, regenerated cellulose, polyvinylpyrrolidone, polyethylene, polypropylene, polyacrylic acid, an ethylene-propylene-diene monomer (EPDM), and fluororubber, preferably one or more selected from among SBR and PVdF, and more preferably SBR. It is preferable that the above materials are used as the first binder polymer in terms of further improving adhesion to the current collector including the mesh structure.

The second binder polymer may be polytetrafluoroethylene (PTFE). When PTFE is used as the second binder polymer while forming an electrode active material in a dry manner, the second binder polymer can be smoothly dispersed in the electrode active material layer, and since the heat resistance and strength of the electrode active material sheet can be improved to a desirable level, the electrode can have enhanced safety under nail penetration conditions even in a case in which it is penetrated by an external object made of metal. In addition, when the second binder polymer is used together with the first binder polymer, since an electrode active material sheet having a sheet form can be manufactured by the dry mixing of the electrode active material and the binder polymer or the like, the current collector including the mesh structure to be described below can be smoothly inserted into the electrode active material sheet.

The PTFE may have a weight-average molecular weight of 8,000 to 56,000 and preferably 24,000 to 50,000, and it is preferable that this range is satisfied because the heat resistance and strength of the electrode active material sheet can be improved and, at the same time, adhesion can be further improved.

The binder polymer may include the first binder polymer and the second binder polymer in a weight ratio of 60:40 to 99.9:0.1, preferably 75:25 to 99:1, and more preferably 85:15 to 92.5:7.5, and this is preferable because thermal decomposition temperature of the binder polymer desired in the present invention can be easily attained and, at the same time, the effect of improving both the above-described safety under nail penetration conditions and output characteristics can be preferably implemented.

When the binder polymer includes the first binder polymer and the second binder polymer, both of the first binder polymer and the second binder polymer may satisfy the thermal decomposition temperature range according to the present invention, and depending on the types and weight ratio of the first and second binder polymers, the thermal decomposition temperature of the entire binder polymer may satisfy the thermal decomposition temperature range according to the present invention.

The thermal decomposition temperature of the binder polymer may be measured by thermogravimetric analysis (TGA). The thermal decomposition temperature of the binder polymer may be defined as the temperature (onset temperature) at a time point at which, when the binder polymer is analyzed by TGA, the mass of the binder polymer starts to decrease due to thermal decomposition.

The binder polymer may be included in an amount of 0.5% to 20% by weight and preferably 1% to 10% by weight in the electrode active material sheet, and it is preferable that this range is satisfied because adhesion to the current collector can be sufficiently improved, and at the same time, an increase in resistance due to the excessive addition of the binder polymer can be prevented.

The electrode active material sheet may include a conductive material in addition to the electrode active material and the binder polymer.

The conductive material is not particularly limited as long as it does not cause a chemical change in a battery being produced and has conductivity, and for example, graphite such as natural graphite or artificial graphite; carbon black such as acetylene black, Ketjen black, channel black, furnace black, lamp black, or thermal black; a conductive fiber such as carbon fiber or metal fiber; a conductive tube such as a carbon nanotube; fluorocarbon; a metal powder such as an aluminum powder or a nickel powder; a conductive whisker such as zinc oxide or potassium titanate; a conductive metal oxide such as titanium oxide; and a conductive material such as a polyphenylene derivative may be used.

The conductive material may be included in an amount of 0.1% to 10% by weight and preferably 0.5% to 5% by weight in the electrode active material sheet.

The thickness of the electrode active material sheet may be in the range of 50 μh to 500 μt and preferably 100μ a to 300 μt.

The current collector includes a mesh structure. When the electrode of the present invention includes a current collector including a mesh structure, in the event of electrode penetration by an external object, the current collector can reduce the area of contact between the external object and a current collector as compared to a commonly used, sheet-type current collector, and thus the risk of ignition or explosion due to an electrical short circuit can be reduced.

The mesh structure may be a structure having a three-dimensional net shape and may include a mesh or holes formed by a plurality of intersecting straight lines or curves.

At least a part of the mesh structure is inserted into the electrode active material sheet. In the electrode of the present invention, at least a part of the mesh structure may be inserted into the electrode active material sheet, and the mesh in the mesh structure may be present within the electrode active material sheet.

The mesh structure may include one or more selected from the group consisting of copper, stainless steel, aluminum, nickel, titanium, calcined carbon, and an aluminum-cadmium alloy and more preferably includes copper.

Since at least a part of the current collector including the mesh structure is inserted into the electrode active material sheet, the size and thickness of the mesh structure may be adjusted in consideration of the size and thickness of the electrode active material sheet and the like.

The mesh structure includes a plurality of mesh holes. The areas of the holes formed in the mesh of the mesh structure may be in the range of 0.010 $mm^2$ to 225 $mm^2$ and preferably 0.25 $mm^2$ to 9.0 $mm^2$, and when this range is satisfied, the risk of occurrence of electrical connection between an external object, e.g., a nail, and the mesh structure in the event of penetration by the external object is reduced, and at the same time, adhesion to the electrode active material sheet can be improved, so safety under nail penetration conditions can be improved, and at the same time, the risk of the electrode active material sheet being detached from the mesh structure can be reduced. In the present specification, "holes formed in a mesh" or "mesh holes" may be defined as planar figures formed by neighboring straight lines or curves which intersect each other in a mesh, and these planar figures may have the shape of a polygon, such as a triangle or a square, a circle, or the like.

The electrode may be a positive electrode and/or a negative electrode, and specifically, may be a negative electrode. Specifically, copper or the like may be used as the current collector of the negative electrode, but copper has high ductility, so in the event of sheet-type current collector penetration by an external object such as a nail, there is a high risk that the current collector may cause an electrical short circuit by coming into contact with a positive electrode current collector or the like. However, when the electrode of the present invention is applied to a negative electrode, it is preferable because safety under nail penetration conditions is excellent and the risk of an electrical short circuit can be prevented.

<Method of Manufacturing Electrode>

Another aspect of the present invention provides a method of manufacturing an electrode, specifically, a method of manufacturing the above-described electrode.

Specifically, the method of manufacturing an electrode of the present invention comprises: preparing a current collector having a mesh structure and an electrode active material sheet comprising an electrode active material and a binder polymer; and placing the electrode active material sheet on the current collector and applying pressure to insert at least a part of the mesh structure into the electrode active material sheet, thereby manufacturing the above-described electrode.

The method of manufacturing an electrode of the present invention includes a process of placing the electrode active material sheet on the current collector including the mesh structure and applying pressure, and therefore, the electrode with enhanced safety under nail penetration conditions and improved output characteristics can be manufactured. In addition, the electrode active material sheet formed using the binder polymer having a specific thermal decomposition temperature range can exhibit excellent adhesion to the current collector.

Hereinafter, the method of manufacturing an electrode of the present invention will be described in detail with reference to drawings. In giving reference numerals to components of each drawing, the same components may have the same numerals as possible even when they are shown in different drawings. In addition, in describing the present invention, when it is determined that a detailed description of a related known configuration or function may obscure the gist of the present invention, the detailed description may be omitted.

FIG. 1 is a diagram for schematically illustrating the method of manufacturing an electrode of the present invention. FIG. 2 is a plan view of an electrode manufactured by the method of manufacturing an electrode of the present invention.

Referring to FIG. 1, the method of manufacturing an electrode of the present invention includes preparing a current collector 10 including a mesh structure 11, and an electrode active material sheet 20*a*, 20*b* including an electrode active material and a binder polymer.

The mesh structure 11 includes a large number of mesh holes. As shown in FIGS. 1 and 2, the areas of the mesh holes 12 in the mesh structure 11 may be in the range of 0.010 $mm^2$ to 225 $mm^2$ and preferably 0.25 $mm^2$ to 9.0 $mm^2$, and when this range is satisfied, the risk of occurrence of electrical connection between an external object, e.g., a nail, and the mesh structure in the event of penetration by the external object is reduced, and at the same time, adhesion to the electrode active material sheet can be improved so that safety under nail penetration conditions can be improved, and at the same time, the risk of the electrode active material sheet being detached from the mesh structure can be reduced. In the present specification, "mesh holes 12" may be defined as planar figures formed by neighboring straight lines or curves which intersect each other in a mesh, and these planar figures may have the shape of a polygon, such as a triangle or a square, a circle, or the like.

The current collector 10 including the mesh structure 11 may be the same as described above for the electrode.

The electrode active material sheet 20*a*, 20*b* may be prepared by a method including the following steps:

(a) mixing an electrode active material and a binder polymer to form a granular composite;
(b) sieving the granular composite; and
(c) applying pressure to the granular composite to form an electrode active material sheet.

In the method of preparing an electrode active material sheet, an electrode active material and a binder polymer are mixed and thus a granular composite is formed (step (a)). When the electrode active material and the binder are mixed, a granular composite in which the electrode active material and the binder are combined by the adhesive ability of the binder can be formed.

The electrode active material and the binder polymer may be the same as described above for the electrode.

A conductive material may be additionally mixed with the electrode active material and the binder polymer. The description of the conductive material may be the same as the description provided for the electrode.

The mixing of the electrode active material and the binder polymer may be performed by dry mixing. It is preferable to carry out dry mixing, since it eliminates the need to carry out a process of drying the mixture.

The method of preparing an electrode active material sheet includes sieving the granular composite (step (b)). Since the sieving process improves the uniformity of the granular composite, components can be uniformly distributed in the electrode active material sheet.

In the method of preparing an electrode active material sheet, pressure is applied to the granular composite and thus an electrode active material sheet is formed (step (c)). When pressure is applied to the granular composite, the granular composite may be aggregated, and thus an electrode active material sheet in the form of a sheet can be formed.

Other descriptions of the electrode active material sheet 20*a*, 20*b* may be the same as the descriptions provided for the electrode.

In addition, the method of manufacturing an electrode of the present invention includes placing the electrode active material sheet 20*a*, 20*b* on the current collector 10 and applying pressure and thus inserting at least a part of the mesh structure 11 into the electrode active material sheet 20*a*, 20*b*.

As shown in FIGS. 1 and 2, since the electrode active material sheet 20*a*, 20*b* is placed on the current collector 10 and then pressure is applied, at least a part of the mesh structure 11 is inserted into the electrode active material sheet 20*a*, 20*b*.

The electrode active material sheet 20*a*, 20*b* may be disposed on one or both sides of the current collector 10. For example, as shown in FIG. 1, the electrode active material sheet 20*a*, 20*b* may be disposed on both sides of the current collector 10.

The application of pressure may be carried out by applying a line pressure, for example, by applying pressure to the electrode active material sheet disposed on the current collector using a roll press 30*a*, 30*b* and thereby inserting at least a part of the mesh structure into the electrode active material sheet.

<Secondary Battery>

Still another aspect of the present invention provides a secondary battery, more specifically, a lithium secondary battery, which includes the above-described electrode.

Specifically, the secondary battery may include: a negative electrode; a positive electrode opposite to the negative electrode; a separator interposed between the negative electrode and the positive electrode; and an electrolyte. The negative electrode and/or the positive electrode and preferably the negative electrode may be the above-described electrode.

The separator is used to separate the negative electrode and the positive electrode and provide a passage for lithium ion migration, and any separator commonly used in a lithium secondary battery may be used without particular limitation, and in particular, a separator that exhibits low resistance to the migration of electrolyte ions and has an excellent electrolyte impregnation ability is preferred. Specifically, a porous polymer film, for example, a porous polymer film formed of a polyolefin-based polymer such as an ethylene homopolymer, a propylene homopolymer, an ethylene/butene copolymer, an ethylene/hexene copolymer, or an ethylene/methacrylate copolymer or a stacked structure having two or more layers thereof, may be used. In addition, a common porous non-woven fabric, for example, a non-woven fabric made of high-melting-point glass fiber, a polyethylene terephthalate fiber, or the like, may be used. Also, in order to ensure heat resistance or mechanical strength, a coated separator that includes a ceramic component or polymer material and is optionally in a single-layer or multi-layer structure may be used.

Examples of the electrolyte used in the present invention may include an organic liquid electrolyte, an inorganic liquid electrolyte, a solid polymer electrolyte, a gel-type polymer electrolyte, an inorganic solid electrolyte, a molten-type inorganic electrolyte, and the like which are usable for manufacturing a secondary battery, but the present invention is not limited thereto.

Specifically, the electrolyte may include a non-aqueous organic solvent and a metal salt.

As the non-aqueous organic solvent, for example, an aprotic organic solvent such as N-methyl-2-pyrrolidone, propylene carbonate, ethylene carbonate, butylene carbonate, dimethyl carbonate, diethyl carbonate, gamma-butyrolactone, 1,2-dimethoxyethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, an ether, methyl propionate, ethyl propionate, or the like may be used.

Among the carbonate-based organic solvents, especially, ethylene carbonate and propylene carbonate, which are cyclic carbonates, are preferably used because they are high-viscosity organic solvents and have high permittivity and thus effectively dissociate a lithium salt. When the above cyclic carbonates are mixed with a low-viscosity, low-permittivity linear carbonate such as dimethyl carbonate and diethyl carbonate in an appropriate ratio and used, an electrolyte having high electrical conductivity can be prepared, and therefore, such mixtures are more preferably used.

As the metal salt, a lithium salt may be used, and the lithium salt is a material that is easy to dissolve in the non-aqueous electrolyte. For example, as an anion of the lithium salt, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used.

In the electrolyte, in addition to the above-described electrolyte components, one or more additives, for example, a haloalkylene carbonate-based compound (e.g., difluoroethylene carbonate), pyridine, triethyl phosphite, triethanolamine, a cyclic ether, ethylenediamine, n-glyme, hexamethylphosphate triamide, a nitrobenzene derivative, sulfur, a quinone imine dye, an N-substituted oxazolidinone, an N,N-substituted imidazolidine, an ethylene glycol dialkyl ether, an ammonium salt, pyrrole, 2-methoxyethanol, aluminum trichloride, and the like may be included for the purpose of enhancing the lifetime characteristics of a battery, suppressing a reduction in battery capacity, enhancing the discharge capacity of a battery, and the like.

Yet another aspect of the present invention provides a battery module including the above-described secondary battery as a unit cell or a battery pack including the same. Since the battery module and the battery pack include the above-described secondary battery having high capacity, excellent rate characteristics, and excellent cycle characteristics, the battery module and the battery pack can be used as a power source for a medium-to-large sized device selected from the group consisting of an electric vehicle, a hybrid electric vehicle, a plug-in hybrid electric vehicle, and a power storage system.

Hereinafter, exemplary embodiments will be presented to aid in the understanding of the present invention, but it is obvious to those skilled in the art that various changes and modifications can be made to the embodiments within the scope of the present description and the scope of the technical idea, and that such changes and modifications are encompassed in the scope of the appended claims.

EXAMPLES

Example 1

<Preparation of Electrode Active Material Sheet>

A 90:10 (w/w) mixture of SBR as a first binder polymer and PTFE (weight-average molecular weight: 40,000 g/mol) as a second binder polymer was used as a binder polymer. The thermal decomposition temperature of the binder polymer measured by TGA was 297° C.

Artificial graphite (average particle diameter ($D_{50}$): 18 cial graphite (average particle diameter (D polymer. The thermal decomposition temperature of the binder polymer measured by TGA was 29Timcal Ltd.) as a conductive material were dry-mixed in a weight ratio of 95:4:1, and thereby a granular composite was prepared. The granular composite was added to distilled water so that solid content was 85%, stirred for two hours using a planetary mixer, and sieved with a sieve having a mesh diameter of 5 mm.

The granular composite was placed in a sheet form and pressed by applying a line pressure with a roll press, and thereby an electrode active material sheet in the form of a sheet was prepared.

<Manufacture of Electrode>

A current collector including a copper mesh structure having dimensions of 36 mm (width)×56 mm (length)×0.05 mm (height), a mesh diameter of 1 mm, and a mesh hole area of 1 $mm^2$ (1 mm (width)×1 mm (length)) was provided.

The electrode active material sheet prepared in the above was placed on both sides of the current collector, a line pressure was applied using a roll press so that the mesh structure was inserted into the electrode active material sheet, and the resultant was used as a negative electrode of Example 1. In the negative electrode prepared as such, the thickness of the electrode active material sheet was 200 μn.

Example 2

A negative electrode was manufactured in the same manner as in Example 1 except that a 95:5 (w/w) mixture of the first binder polymer and the second binder polymer was used as a binder polymer (thermal decomposition temperature: 308° C.).

Example 3

A negative electrode was manufactured in the same manner as in Example 1 except that an 80:20 (w/w) mixture of the first binder polymer and the second binder polymer was used as a binder polymer (thermal decomposition temperature: 284° C.).

Comparative Example 1

A negative electrode was manufactured in the same manner as in Example 1 except that only the second binder polymer (thermal decomposition temperature: 326° C.) used in Example 1 was used as a binder polymer.

Comparative Example 2

The same method as Example 1 was used except that only the first binder polymer (thermal decomposition temperature: 263° C.) used in Example 1 was used as a binder polymer. However, in the case of Comparative Example 2, the dispersibility of the used binder polymer was low, and it was impossible to manufacture a complete negative electrode.

Comparative Example 3

The negative electrode active material used in Example 1, a 2:1 (w/w) mixture of SBR and CMC as a binder polymer, and carbon black (product name: Super-C, manufacturer: Timcal Ltd.) as a conductive material were added, in a weight ratio of 95:4:1, to distilled water, and thereby a negative electrode slurry was prepared.

The negative electrode slurry was applied onto a copper current collector (thickness: 20 μh) in a sheet form, roll-pressed, and dried in a 130° C. vacuum oven for 10 hours, and thereby a negative electrode active material layer (thickness: 210 μ0) was formed, and a negative electrode was manufactured.

TABLE 1

| | Binder polymer | | | |
|---|---|---|---|---|
| | Type of first binder polymer | Type of second binder polymer | Weight ratio of first binder polymer and second binder polymer | Thermal decomposition temperature (° C.) |
| Example 1 | SBR | PTFE | 90:10 | 297 |
| Example 2 | SBR | PTFE | 95:5 | 308 |
| Example 3 | SBR | PTFE | 80:20 | 284 |
| Comparative Example 1 | — | PTFE | 0:100 | 326 |
| Comparative Example 2 | SBR | — | 100:0 | 263 |

Experimental Example

<Manufacture of Secondary Battery>

$LiNi_{0.8}Co_{0.1}Mn_{0.1}O_2$ as a positive electrode active material, carbon black as a conductive material, and PVdF as a binder were mixed in a weight ratio of 94:3.5:2.5 and added to N-methyl-2-pyrrolidone (NMP), and thereby a positive electrode slurry was prepared. The prepared positive electrode slurry was applied onto an aluminum current collector, dried, roll-pressed, and cut to a predetermined size, and thereby a positive electrode was manufactured.

An electrode assembly was manufactured by interposing a porous polyethylene separator between the positive electrode obtained in the above and the negative electrode of Example 1, and after placing the electrode assembly in a case, an electrolyte was injected into the case, and thereby a secondary battery of Example 1 was manufactured.

As an electrolyte, a solution prepared by adding, to an organic solvent in which ethylene carbonate (EC) and diethyl carbonate (DEC) were mixed in a volume ratio of 30:70, $LiPF_6$ as a lithium salt at a concentration of 1 M was used.

Secondary batteries of Examples 2 and 3, Comparative Examples 1 to 3 were manufactured in the same manner as above except that the negative electrodes of Examples 2 and 3, Comparative Examples 1 to 3, respectively, were used.

Experimental Example

Experimental Example 1: Testing of Safety for Nail-Penetration

After fully charging each of the secondary batteries manufactured in Examples 1 to 3 and Comparative Examples 1 to 3 under the conditions of 0.1 C and 4.2 V, a nail having a diameter of 10 mm was lowered at a speed of 25 mm/s to penetrate the center of the battery. The penetration test was terminated at a time point at which the nail passed through the battery and 10 mm of the nail protruded out of the battery. Five of each of the secondary batteries manufactured in Examples 1 to 3 and Comparative Examples 1 to 3 were manufactured, and the above-described penetration test was repeated five times.

Table 2 shows 1) the number of secondary battery ignition events during five tests and 2) maximum temperatures of unignited secondary batteries, if there were any.

TABLE 2

| | Number of ignition events during penetration test (nail diameter: 10 mm) | Maximum temperature of unignited secondary battery (° C.) |
|---|---|---|
| Example 1 | 0/5 | 34.6 |
| Example 2 | 2/5 | 51.9 |
| Example 3 | 1/5 | 48.2 |
| Comparative Example 1 | 4/5 | 78.6 |
| Comparative Example 2 | Impossible to manufacture battery | Impossible to manufacture battery |
| Comparative Example 3 | 5/5 | — |

Referring to Table 2, it can be seen that in the case of the secondary batteries of Examples, considering that the numbers of ignitions were lower and the maximum temperatures of unignited secondary batteries were lower than Comparative Examples, safety under nail penetration conditions was excellent.

DESCRIPTION OF REFERENCE NUMERALS

10: current collector
11: mesh structure
12: mesh holes
20*a*, 20*b*: electrode active material sheet
30*a*, 30*b*: roll press

The invention claimed is:

1. A method of manufacturing an electrode comprising an electrode active material sheet comprising an electrode active material and a binder polymer, and a current collector having a mesh structure, wherein at least a part of the mesh structure is present in the electrode active material sheet, wherein the binder polymer has a thermal decomposition temperature ranging from 270° C. to 315° C., wherein the binder polymer comprises a first binder polymer and a second binder polymer, wherein the binder polymer comprises the first binder polymer and the second binder polymer in a weight ratio of 85:15 to 92.5:7.5, and wherein the first binder polymer consists of styrene-butadiene rubber, and the second binder polymer comprises polytetrafluoroethylene, the method comprising:

preparing the current collector having the mesh structure and the electrode active material sheet comprising the electrode active material and the binder polymer; and placing the electrode active material sheet on the current collector and applying pressure to insert at least a part of the mesh structure into the electrode active material sheet, wherein the electrode active material sheet is prepared by a method including:

(a) mixing the electrode active material and the binder polymer to form a granular composite;

(b) sieving the granular composite; and (c) applying pressure to the granular composite to form the electrode active material sheet.

2. The method of claim 1, wherein at least one of the applying pressure to insert at least the part of the mesh structure into the electrode active material sheet and the applying pressure to the granular composite is carried out by applying a line pressure.

* * * * *